July 10, 1923.
G. W. LEWIS
DUSTPAN
Filed June 17, 1922
1,461,624
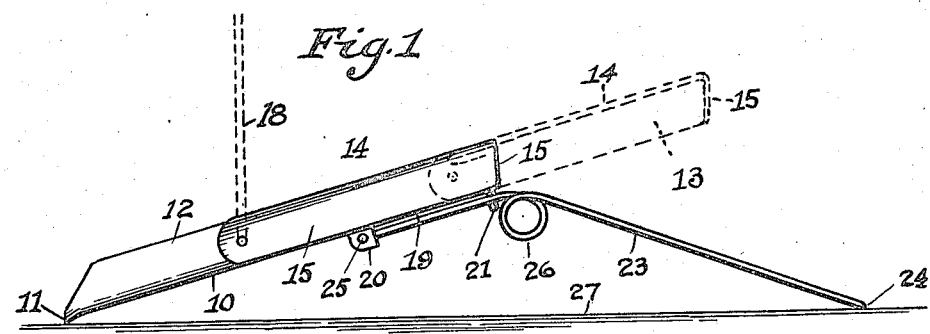
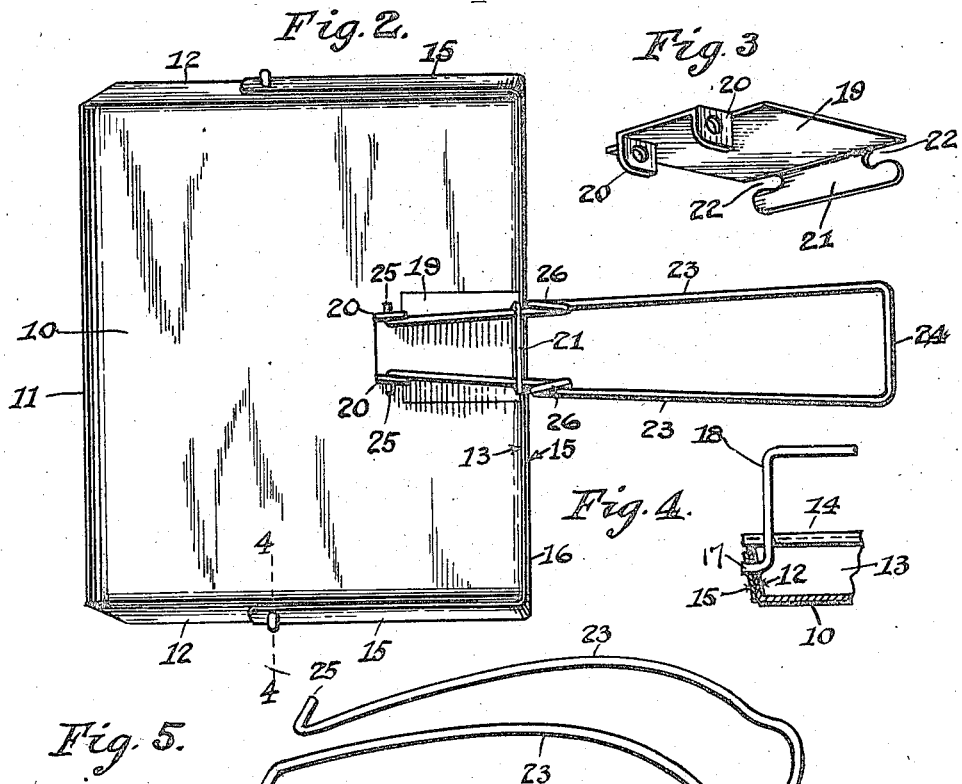
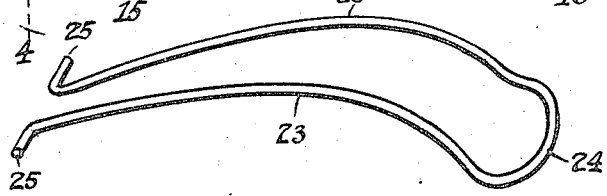
George W. Lewis INVENTOR.
BY
ATTORNEY.

Patented July 10, 1923.

1,461,624

UNITED STATES PATENT OFFICE.

GEORGE W. LEWIS, OF CHICAGO, ILLINOIS.

DUSTPAN.

Application filed June 17, 1922. Serial No. 569,096.

*To all whom it may concern:*

Be it known that I, GEORGE W. LEWIS, a citizen of the United States, residing at Chicago, in the county of Cook and State of Illinois, have invented certain new and useful Improvements in Dustpans, of which the following is a specification.

This invention relates to dust pans of the foot operated class, and has for one of its objects to increase the efficiency and simplicity of devices of this character.

Another object of the invention is to provide a device of this character including a combined support and handle of resilient material operative to hold the dust receiving pan at the requisite inclination to receive the dust and adapted to be depressed at the rear as by the pressure of the foot, to cause the support to move backwardly upon the floor and thus cause the body of the pan to "creep" to the rear to facilitate the gathering of the dust.

Another object of the invention is to provide a device of this character including a combined support and handle of resilient material operative to hold the dust receiving pan at the requisite inclination to receive the dust and adapted to be depressed at the rear as by the pressure of the foot, and with a stop to prevent abnormal downward movement.

With these and other objects in view the invention consists in certain novel features of construction as hereinafter shown and described and then specifically pointed out in the claim, and in the drawings illustrative of the preferred embodiment of the invention:—

Figure 1 is a side elevation of the improved device.

Fig. 2 is a bottom plan view.

Fig. 3 is an enlarged detached perspective view from beneath, of the holding plate for the combined handle and support.

Fig. 4 is a detail in section on the line 4—4 of Fig. 2.

Fig. 5 is a detached perspective view of a modified form of the combined handle and support.

The improved device comprises a body or receiver for the dust and formed with a bottom portion 10 having a slightly downturned front edge 11 and upwardly directed sides 12 and rear 13, the sides and rear portions being preferably flaring slightly as indicated.

Extending over a portion of the rear of the body is a closure including a top portion 14 and depending sides 15 engaging over the sides 12 of the body, and a depending rear 16 engaging over the rear 13 of the body. The sides and rear portions of the partial cover are inclined inwardly toward their lower edges to correspond to and closely engage the sides and rear of the body.

The partial closure is thus slidable rearwardly on the sides 12 of the body as guides.

The forward ends of the side portions 15 of the partial closure and the sides 12 of the body are perforated to receive the inturned ends 17 of a bail member 18, as illustrated in Figs. 1 and 4. By this means the partial closure is locked in position upon the body and a convenient carrying bail provided. When the bail is detached, which may be readily accomplished by forcing the ends 17 outwardly, the partial closure may be moved rearwardly as indicated by dotted lines in Fig. 1, to entirely uncover the body of the pan, or to entirely remove the partial closure, as will be obvious.

Attached in any suitable manner to the under face of the bottom 10 of the body is a plate 19 having perforated ears 20 bent therefrom at one end and with the rear portion bent at right angles to the plate to form a catch member 21 transversely of the plate.

At its ends the bent portion 21 is provided with outwardly opening seats 22 which are slightly larger at their inner ends than at their outer or inlet ends as shown in Fig. 3.

A combined handle and support forms a part of the invention, and is formed of resilient material, for instance a section of relatively heavy wire, bent into elongated U-shape to produce spaced side portions 23 and transverse connecting end portion 24. At their free ends the sides 23 are outturned in opposite directions as shown at 25, and passed through the perforations of the ears 20, with the sides engaged in the recesses 22 as shown.

The side portions 23 are bent intermediate their ends at angles to their longitudinal axes, as shown in Fig. 1, and each side turned into a coil 26, the coils extending toward the floor, indicated at 27.

The side portions 23 are initially arranged with the coils pressing against each other and with the terminals 25 crossing each other and require some force to separate the sides 23 to enable them to be engaged in the recesses 22 and at the same time insert the terminal 25 in the apertures in the ears 20. When this is done, the combined handle and support is firmly locked in position on the body, and can be dislodged only by the exercise of considerable force applied to distend the sides 23 to detach them from the recesses 22, a force which will not be imparted during the operation of the device.

On the contrary, any lateral force applied to the support or handle, would force the sides more firmly into the recesses, and lessen the chances for separating the handle from the body, except by abnormal pressure manually applied.

When not in use, or when the pan is to be shipped or stored, the combined handle and support can be easily detached by distending the portions 23 until they are free from the recesses 22.

When the combined handle and support is applied, the downturned edge 11 and the transverse portion 24 only engage the floor 27, thus holding the bottom 10 of the body inclined upwardly and rearwardly, as shown in Fig. 1, or about in the position which an ordinary dust pan is held by the operator while the dust is being swept thereon.

When the improved structure is employed, the friction of the "lip" 11 and the terminal 24 of the support are sufficient to resist any displacement of the body when the dust is swept thereon. Then the operator can move the device on the floor by lateral pressure of one foot to bring the lip 11 in proper position relative to the dust to be swept up, and when this is done the operator presses downwardly with one foot upon the members 23, the coils 26 first striking the floor to limit the downward movement and prevent undue depression of the body.

This downward pressure causes the relatively sharp terminal 11 to closely engage the floor 27, while the relatively smooth terminal 24 slips over the floor. Then when the pressure of the foot is removed, the body will be drawn backwardly a short distance while the terminal 24 retains its position. Thus the body is caused to produce a "creeping" or "step by step" movement every time the combined support and handle is actuated.

In sweeping the dust over the lip 11, a certain small percentage remains on the floor next to the lip, and as the lip is caused to recede by the creeping action above described, this small portion of the dust remains spaced from the lip and can be swept into the pan, and as the pan is caused to repeatedly "creep" away from the line of dust by the depression of the support 23, the amount left on the floor is finally completely swept into the pan.

The coil 26 serves an important purpose by preventing the rear of the pan from being forced below an operative point.

In Fig. 5 the combined handle and support is shown constructed without the coils 26, which may be employed under some circumstances.

The improved device is simple in construction, can be manufactured of any size and of any suitable material.

The combined support and handle may be constructed of strips of steel or other resilient material or metal, and round, flat or of other form transversely, and it is not desired to limit the invention in any manner in this respect.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

A device of the class described comprising a member adapted to be attached to the body of a dust pan and outturned at one end with laterally opening seats in the outturned portion, perforated ears directed from the plate at the other end and in spaced relation, a combined support and handle bent from a section of resilient material to form spaced side portions and each side portion turned into a coil intermediate the ends to increase the resiliency and form stops to limit the downward movement of the pan, the free ends of the side portions being formed with oppositely directed portions to enter the apertures of the ears and the sides of the resilient member to enter said seats and retained in place therein by the resiliency of the handle member.

In testimony whereof, I affix my signature hereto.

GEORGE W. LEWIS.